(12) United States Patent
Higuchi et al.

(10) Patent No.: US 7,223,819 B2
(45) Date of Patent: May 29, 2007

(54) GOLF BALL

(75) Inventors: Hiroshi Higuchi, Chichibu (JP); Nobuyuki Kataoka, Chichibu (JP); Atsushi Nanba, Chichibu (JP); Hiroto Sasaki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 143 days.

(21) Appl. No.: 10/929,423

(22) Filed: Aug. 31, 2004

(65) Prior Publication Data

US 2006/0047080 A1 Mar. 2, 2006

(51) Int. Cl.
*A63B 37/06* (2006.01)
*C08L 9/00* (2006.01)

(52) U.S. Cl. ............ 525/193; 525/274; 473/371; 473/372

(58) Field of Classification Search ............... None
See application file for complete search history.

(56) References Cited

U.S. PATENT DOCUMENTS

| | | | |
|---|---|---|---|
| 4,546,980 A | 10/1985 | Gendreau et al. | |
| 4,683,257 A | 7/1987 | Kakiuchi et al. | |
| 4,770,422 A | 9/1988 | Isaac | |
| 4,929,678 A | 5/1990 | Hamada et al. | |
| 4,955,613 A | 9/1990 | Gendreau et al. | |
| 5,082,285 A | 1/1992 | Hamada et al. | |
| 6,194,505 B1* | 2/2001 | Sone et al. ............ | 524/432 |
| 6,312,346 B1 | 11/2001 | Sugimoto | |
| 2002/0052254 A1* | 5/2002 | Ichikawa et al. ........ | 473/378 |
| 2003/0125450 A1* | 7/2003 | Fujisawa et al. ........ | 524/502 |
| 2003/0207999 A1* | 11/2003 | Higuchi et al. .......... | 525/274 |

FOREIGN PATENT DOCUMENTS

| | | |
|---|---|---|
| JP | 61-71070 A | 4/1986 |
| JP | 62-89750 A | 4/1987 |
| JP | 62-112574 A | 5/1987 |
| JP | 63-275356 A | 11/1988 |
| JP | 2-268778 A | 11/1990 |
| JP | 3-151985 A | 6/1991 |
| JP | 7-268132 A | 10/1995 |
| JP | 11-35633 A | 2/1999 |
| JP | 11-70187 A | 3/1999 |
| JP | 11-164912 A | 6/1999 |
| JP | 11-319148 A | 11/1999 |
| JP | 2001-149505 A | 6/2001 |
| JP | 2001-149507 A | 6/2001 |
| JP | 2002-293996 A | 10/2002 |
| JP | 2004180733 * | 7/2004 |

OTHER PUBLICATIONS

Mark R. Mason et al.; "Hydrolysis of Tri-*tert*-butylaluminum: The First Structural Characterization of Alkylalunoxanes $[(R_2Al)_2O]_n$ and $(RAlO)_n$,"; J. Am. Chem. Soc. 1993, 115; pp. 4971-4984.

C. Jeff Harlan; "Three-Coordinate Aluminum is Not a Prerequisite for Catalytic Activity in the Zirconocene—Alumoxane Polymerization of Ethylene"; J. Am. Chem. Soc. 1995, E, 117; pp. 6465-6474.

"Reaction Mechanisms in Metallocene Catalyzed Olefin Polymerization"; Report of Research & Development, vol. 23, No. 9; 1994; pp. 5-15.

* cited by examiner

*Primary Examiner*—David J. Buttner
(74) *Attorney, Agent, or Firm*—Sughrue Mion, PLLC

(57) ABSTRACT

A golf ball which is formed from a vulcanized rubber compound composed of 100 parts by weight of a rubber base material, 10 to 60 parts by weight of an unsaturated carboxylic acid and/or a metal salt thereof, 0.1 to 5 parts by weight of an organosulfur compound, 5 to 80 parts by weight of an inorganic filler, and 0.1 to 3 parts by weight of an organic peroxide, the rubber base material being composed of a first polybutadiene accounting for 50 to 95 wt % and a second polybutadiene accounting for 5 to 50 wt %, both polybutadiene being synthesized by using a rare earth element-based catalyst, the first polybutadiene containing no less than 60 wt % of cis-1,4 bonds and having a Mooney viscosity ($ML_{1+4}$ (100° C.)) no lower than 50 and the second polybutadiene containing no less than 60 wt % of cis-1,4 bonds and having a Mooney viscosity ($ML_{1+4}$ (100° C.)) no higher than 45. The golf ball is characterized by good rebound resilience and good workability with which it is produced.

8 Claims, No Drawings

GOLF BALL

BACKGROUND OF THE INVENTION

The present invention relates to a golf ball characterized by good rebound resilience, good flying performance, and good extrusion workability with which it is produced. The golf ball has a solid core formed from an improved rubber compound.

In an attempt to impart good rebound resilience to golf balls, various improvements have been made on the formulation of polybutadiene as a base material for golf balls.

Among such improvements is a new rubber compound for solid balls which was disclosed in Japanese Patent Laid-open No. Sho 62-89750, for example. This rubber compound is composed of a polybutadiene (as the base material) having a Mooney viscosity of 70 to 100, which is synthesized by using a nickel or cobalt catalyst, and another polybutadiene having a Mooney viscosity of 30 to 90, which is synthesized by using a lanthanum-based catalyst, or another polybutadiene having a Mooney viscosity of 20 to 50, which is synthesized by using a nickel or cobalt catalyst. However, there still exists a demand for improvement on rebound resilience.

Also, there is disclosed in Japanese Patent Laid-open No. Hei 2-268778 a golf ball which is molded from a blend of a polybutadiene having a Mooney viscosity less than 50, which is synthesized by using a group VIII element catalyst, and another polybutadiene having a Mooney viscosity less than 50, which is synthesized by using a lanthanide catalyst. This golf ball, however, is poor in rebound resilience.

Moreover, there is disclosed in Japanese Patent Laid-open No. Hei 11-70187 a multi-piece solid golf ball having an intermediate layer formed from a polybutadiene having a low Mooney viscosity. There is disclosed in Japanese Patent Laid-open No. Hei 11-319148 a solid golf ball formed from a rubber compound composed of a polybutadiene having a Mooney viscosity of 50 to 69, which is synthesized by using a nickel or cobalt catalyst, and another polybutadiene having a Mooney viscosity of 20 to 90, which is synthesized by using a lanthanoid-based catalyst. There is disclosed in Japanese Patent Laid-open No. Hei 11-164912 a solid golf ball formed from a rubber compound which contains no more than 2.0% of 1,2-vinyl bond and has an Mw/Mn ratio no larger than 3.5 (which is a ratio of weight-average molecular weight to number-average molecular weight). There is disclosed in Japanese Patent Laid-open No. Sho 63-275356 a golf ball which is formed from a rubber compound containing a polybutadiene having a high Mooney viscosity. There is disclosed in Japanese Patent Laid-open No. Hei 3-151985 a golf ball which is formed from a rubber compound composed of two kinds of polybutadiene, one having a high number-average molecular weight and the other having a low number-average molecular weight. However, all the disclosed rubber compounds merely give golf balls poor in rebound resilience.

There is disclosed in Japanese Patent Laid-open No. Sho 61-71070 a rubber compound with two kinds of organic peroxide, and there is disclosed in Japanese Patent Laid-open No. Sho 62-112574 a rubber compound with a smaller amount of organic peroxide. These rubber compounds, however, are poor in rebound resilience and slow in crosslinking, which leads to extremely low productivity.

Also, the rubber compounds disclosed in Japanese Patent Laid-open Nos. 2001-149505 to 2001-149507 still have room for improvement on rebound resilience.

SUMMARY OF THE INVENTION

The present invention was completed in view of the foregoing. It is an object of the present invention to provide a golf ball characterized by good shot feel, good rebound resilience, and good flying performance. The golf ball permits production with good extrusion workability, short vulcanizing time, and high productivity.

In order to achieve the above-mentioned object, the present inventors carried out extensive researches, which led to the following finding. A solid golf ball with good rebound resilience can be produced with high productivity if its solid core is formed from a vulcanized product of a rubber compound which is composed of a rubber base material and additives as specified below. The rubber base material is composed of two kinds of polybutadiene, both synthesized by using a rare earth element-based catalyst. The two polybutadienes contain cis-1,4 bonds in an amount less than 60 wt %, but one has a Mooney viscosity ($ML_{1+4}$ (100° C.)) no lower than 50 and the other has a Mooney viscosity no higher than 45. The additives include an unsaturated carboxylic acid and/or a metal salt thereof, an organosulfur compound, an inorganic filler, and an organic peroxide. Their amount based on 100 parts by weight of the rubber base material is 10 to 60, 0.1 to 5, 5 to 80, and 0.1 to 3 parts by weight, respectively. The organic peroxide should be composed of two or more species differing half-life such that the ratio of $b_t/a_t$ is 7 to 20, where $a_t$ denotes the half-life of an organic peroxide (a) having the shortest half-life at 155° C. and $b_t$ denotes the half-life of an organic peroxide (b) having the longest half-life at 155° C.

In other words, it was found that a rubber compound exhibits good extrusion workability and yields golf balls that excel in rebound resilience if it is composed of a high-Mooney viscosity polybutadiene and a low-Mooney viscosity polybutadiene, both synthesized by using a rare earth metal catalyst. It was also found that, unlike the conventional technology in which a rubber compound with an organic peroxide in a reduced amount needs a long vulcanizing time (which leads to low productivity) and has poor rebound resilience, a rubber compound improves in workability and decreases in vulcanizing time (thereby improving in productivity) and exhibits higher rebound resilience, if it is based on a high-resilient polybutadiene synthesized by using a rare earth element-based catalyst and it is also compounded with a small amount of two or more organic peroxides greatly differing in half-life. The present invention is based on the foregoing finding.

The present invention is directed to a golf ball defined in the following.

[1] A golf ball which is formed from a vulcanized rubber compound composed of 100 parts by weight of a rubber base material, 10 to 60 parts by weight of an unsaturated carboxylic acid and/or a metal salt thereof, 0.1 to 5 parts by weight of an organosulfur compound, 5 to 80 parts by weight of an inorganic filler, and 0.1 to 3 parts by weight of an organic peroxide, the rubber base material being composed of a first polybutadiene accounting for 50 to 95 wt % and a second polybutadiene accounting for 5 to 50 wt %, both polybutadiene being synthesized by using a rare earth element-based catalyst, the first polybutadiene containing no less than 60 wt % of cis-1,4 bonds and having a Mooney viscosity ($ML_{1+4}$ (100° C.)) no lower than 50 and the second polybutadiene containing no less than 60 wt % of cis-1,4 bonds and having a Mooney viscosity ($ML_{1+4}$ (100° C.)) no higher than 45.

[2] A golf ball of [1], wherein the first polybutadiene has a molecular weight distribution Mw/Mn of 2.0 to 6.0, where Mw denotes a weight-average molecular weight and Mn denotes a number-average molecular weight.

[3] A golf ball of [1], wherein the first polybutadiene is a modified polybutadiene rubber which is obtained by synthesizing an ordinary polybutadiene with a Nd-based catalyst and subsequently reacting the thus obtained polybutadiene with an end group modifier.

[4] A golf ball of [1], wherein the second polybutadiene has a molecular weight distribution Mw/Mn of 2.0 to 6.0, where Mw denotes a weight-average molecular weight and Mn denotes a number-average molecular weight.

[5] A golf ball of [1], wherein the second polybutadiene is a modified polybutadiene rubber which is obtained by synthesizing an ordinary polybutadiene with a Nd-based catalyst and subsequently reacting the thus obtained polybutadiene with an end group modifier.

[6] A golf ball of [1], wherein the second polybutadiene has a Mooney viscosity ($ML_{1+4}$ (100° C.)) no higher than 40.

[7] A golf ball of [1], wherein the organic peroxide is composed of two or more species of organic peroxides which are specified by their half-life such that the ratio of $b_t/a_t$ is 7 to 20, where at denotes the half-life of an organic peroxide (a) having the shortest half-life at 155° C. and $b_t$ denotes the half-life of an organic peroxide (b) having the longest half-life at 155° C.

[8] A golf ball of [1], wherein the total content of the organic peroxide is 0.1 to 0.8 part by weight for 100 parts by weight of the rubber base material.

DETAILED DESCRIPTION OF THE INVENTION

The invention will be described in more detail in the following.

The golf ball according to the present invention is formed from a specific vulcanized rubber compound which is composed of, (A) a rubber base material composed mainly of two polybutadienes synthesized by using a rare earth element-based catalyst, both containing no less than 60 wt % of cis-1,4 bonds and differing in Mooney viscosity ($M_{1+4}$ (100° C.)) from each other, (B) an unsaturated carboxylic acid and/or a metal salt thereof, (C) an organosulfur compound, (D) an inorganic filler, and (E) an organic peroxide.

The first and second polybutadienes constituting component (A) should contain cis-1,4 bonds in an amount no less than 60%, preferably no less than 80%, more preferably no less than 90%, and most desirably no less than 95%. ("%" means "wt %" hereinafter.) The rubber compound will be poor in rebound resilience if the content of cis-1,4 bonds is excessively small.

Moreover, the polybutadienes should contain 1,2-vinyl bonds in an amount no more than 2%, preferably no more than 1.7%, and more preferably no more than 1.5%. The rubber compound will be poor in rebound resilience if the content of 1,2-vinyl bonds is excessively large.

The first polybutadiene should have a Mooney viscosity ($ML_{1+4}$ (100° C.)) no smaller than 50, preferably no smaller than 51, more preferably no smaller than 52, and most desirably no smaller than 54, and no larger than 140, preferably no larger than 120, more preferably no larger than 100, and most desirably no larger than 80.

The second polybutadiene should have a Mooney viscosity no large than 45, preferably no larger than 40, more preferably no larger than 38, and most desirably no larger than 36, and no smaller than 10, preferably no smaller than 15, more preferably no smaller than 20, and most desirably no smaller than 25.

Incidentally, "Mooney viscosity" used in the present invention is an index of viscosity for industrial use which is measured (according to JIS K6300) with a Mooney viscometer as a rotary plastometer. It is expressed in terms of $ML_{1+4}$ (100° C.), where M stands for Mooney viscosity, L stands for large rotor (L type), 1+4 indicates that duration of preheating is one minute and duration of rotor rotation is four minutes, and 100° C. is the temperature at which measurement is carried out.

The polybutadiene used in the present invention should be one which is synthesized by using a rare earth element-based catalyst selected from any known ones.

An example of the catalyst is a combination of a compound of a lanthanum rare earth element with an organoaluminum compound, alumoxane, halogen containing compound, and Lewis base (optional).

The compound of a lanthanum rare earth element includes halides, carboxylates, alcoholates, thioalcoholates, and amides of metals with an atomic number 57 to 71.

The organoaluminum compound includes those which are represented by $AlR^1R^2R^3$ (where $R^1$, $R^2$, and $R^3$ are identical or different groups, each denoting hydrogen or a residue of $C_{1-8}$ hydrocarbon compound).

The almoxane is a compound having the structure represented by the formula (I) or (II) below. It may take on an associated form as described in *Fine Chemical* 23, (9), 5 (1994), *J. Am. Chem. Soc.*, 115, 4971 (1993), and *J. Am. Chem. Soc.*, 117, 6465 (1995).

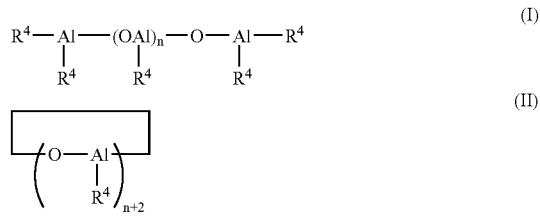

(where, $R^4$ is a $C_{1-20}$ hydrocarbon group and n is an integer of 2 or above.)

The halogen containing compound may be any of aluminum halide, strontium halide, and metal halides. The aluminum halide is a compound represented by $AlX_nR_{3-n}$ (where, X denotes a halogen, R denotes a residue of $C_{1-20}$ hydrocarbon compound, such as alkyl, aryl, and aralkyl, and n is 1, 1.5, 2, or 3). The strontium halide includes $Me_3SrCl$, $Me_2SrCl_2$, $MeSrHCl_2$, and $MeSrCl_3$. The metal halide includes silicon tetrachloride, tin tetrachloride, and titanium tetrachloride.

The Lewis base includes acetylacetone and ketone alcohol, which are used to complex the compound of lanthanoid series rare earth element.

The lanthanum series rare earth compound which is advantageously used as a catalyst in the present invention is a neodymium compound. It is highly active to yield a polybutadiene with a high content of 1,4-cis bonds and a low content of 1,2-vinyl bonds. Examples of this catalyst are given in Japanese Patent Laid-open No. Hei 11-35633.

For the polybutadiene polymerized by using a rare earth element-based catalyst (or lanthanum series rare earth compound) to have the cis content and Mw/Mn ratio as specified above, it is desirable that the amount of butadiene should be 1,000 to 2,000,000 times, particularly 5,000 to 1,000,000 times, the amount of the lanthanum series rare earth compound (in molar ratio). It is also desirable that the molar ratio of $AlR^1R^2R^3$ to the lanthanum series rare earth compound should be from 1 to 1,000, particularly from 3 to 500. It is also desirable that the molar ratio of the halogen compound to the lanthanum series rare earth compound should be from 0.1 to 30, particularly from 0.2 to 15. It is also desirable that the molar ratio of the Lewis base to the lanthanum series rare earth compound should be from 0 to 30, particularly from 1 to 10. Polymerization may be bulk polymerization or vapor phase polymerization with or without solvent. The polymerization temperature is usually from −30° C. to 150° C., preferably from 10° C. to 100° C.

Polymerization of butadiene by using the rare earth element-based catalyst may be either bulk polymerization or vapor phase polymerization with or without solvent. The polymerization temperature is usually from −30° C. to 150° C., preferably from 10° C. to 100° C.

The polybutadiene as component (A) in the present invention may be a modified polybutadiene which is obtained if polymerization by using a rare earth element-based catalyst is followed by reaction of the polymer's active end groups with an end group modifier.

The modified polybutadiene rubber may be obtained by using any of the following seven end group modifiers.

(1) A compound having one or more alkoxysilyl groups, or desirably an alkoxysilane compound having at least one epoxy group or isocyanate group in the molecule. Examples of epoxy group containing alkoxysilane are listed below.

3-glycidyloxypropyltrimethoxysilane,
3-glycidyloxypropyltriethoxysilane,
(3-glycidyloxypropyl)methyldimethoxysilane,
(3-glycidyloxypropyl)methyldiethoxylsilane,
β-(3,4-epoxycyclohexyl)trimethoxysilane,
β-(3,4-epoxycyclohexyl)triethoxysilane,
β-(3,4-epoxycyclohexyl)methyldimethoxysilane,
β-(3,4-epoxycyclohexyl)ethyldimethoxysilane, condensate of 3-glycidyloxypropyltrimethoxysilane, and condensate of (3-glycidyloxypropyl)methyldimethoxysilane.

Examples of isocyanate group containing alkoxysilane are listed below.

3-isocyanatepropyltrimethoxysilane,
3-isocyanatepropyltriethoxysilane,
(3-isocyanatepropyl)methyldimethoxysilane,
(3-isocyanatepropyl)methyldiethoxysilane, condensate of 3-isocyanatepropyltrimethoxysilane, and condensate of (3-isocyanatepropyl)methyldimethoxysilane.

Any of the alkoxysilane compounds listed above may be used in combination with a Lewis acid to enhance its reactivity when it is applied to active end groups. The Lewis acid functions as a catalyst to promote the coupling reaction, so that the resulting modified polymer has improved storage stability with less cold flow. Examples of the Lewis acid include dialkyltin dialkyl malate, dialkyltin dicarboxylate, and aluminum trialkoxide.

(2) Any of halogenated organometallic compounds, metal halide compounds, and organometallic compounds, which are represented by the following formulas.

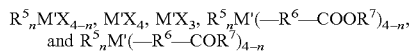

(wherein $R^5$ and $R^6$ are identical or different $C_{1-20}$ hydrocarbon group; $R^7$ is a $C_{1-20}$ hydrocarbon group which may have a carbonyl or ester group in the side chain; M' is a tin atom, silicon atom, germanium atom, or phosphorus atom; X is a halogen atom; and n is an integer of 0 to 3.)

(3) Heterocumulene compound having in the molecule a Y=C=Z bond (where Y is a carbon atom, oxygen atom, nitrogen atom, or sulfur atom; and Z is an oxygen atom, nitrogen atom, or sulfur atom).

(4) Three-membered heterocyclic compound having in the molecule the following bonds.

(where Y is an oxygen atom, nitrogen atom, or sulfur atom).

(5) Halogenated isocyano compounds.

(6) Any of carboxylic acids, acid halides, ester compounds, carboxylic ester compounds, and acid anhydrides, which are represented by the following formulas.

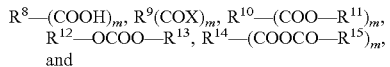
and

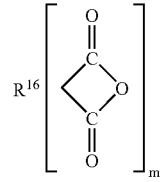

(where, $R^8$ to $R^{16}$ are identical or different $C_{1-50}$ hydrocarbon groups, X is a halogen atom, and m is an integer of 1 to 5.)

(7) Metal carboxylate represented by any of the following formulas.

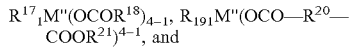

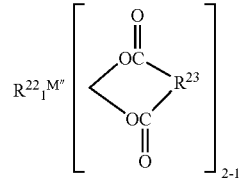

(where, $R^{17}$ to $R^{23}$ are identical or different $C_{1-20}$ hydrocarbon group; M" is a tin atom, silicon atom, or germanium atom; and l is an integer of 0 to 3).

Typical examples and usage of the end group modifiers listed above are shown in Japanese Patent Laid-open Nos. Hei 11-35633, Hei 7-268132, and 2002-29399.

According to the present invention, the first and second polybutadienes should have a molecular weight distribution Mw/Mn (where Mw denotes a weight-average molecular weight and Mn denotes a number-average molecular weight), which is no smaller than 2.0, preferably no smaller than 2.2, more preferably no smaller than 2.4, most desirably no smaller than 2.6, and no larger than 6.0, preferably no larger than 5.0, more preferably no larger than 4.0, most desirably no larger than 3.4. With an excessively small or larger value of Mw/Mn, the rubber compound will be poor in workability or poor in rebound resilience, respectively.

According to the present invention, the rubber base material is composed mainly of the first and second polybutadienes. The amount of the first polybutadiene in the rubber base material should be no less than 50%, preferably no less than 60%, more preferably no less than 70%, most desirably no less than 75%, and no more than 95%, preferably no more than 90%, more preferably no more than 85%, most desirably no more than 80%. On the other hand, the amount of the second polybutadiene in the rubber base material should be no less than 5%, preferably no less than 10%, more preferably no less than 15%, most desirably no less than 20%, and no more than 50%, preferably no more than 40%, more preferably no more than 30%, most desirably no more than 20%. The first polybutadiene in an excessively large amount will hamper extrusion workability, and the second polybutadiene in an excessively large amount will adversely affect rebound resilience.

Incidentally, the rubber base material may optionally be compounded with other rubber components than the polybutadienes. Such rubber components include polybutadiene excluding the one mentioned above polymerized by using a catalyst which is a metal compound of a group VIII element, diene rubber (such as styrene butadiene rubber), natural rubber, isoprene rubber, and ethylene propylene diene rubber.

The unsaturated carboxylic acids used as component (B) include acrylic acid, methacrylic acid, maleic acid and fumaric acid. Acrylic acid and methacrylic acid are especially preferred. Metal salts of the unsaturated carboxylic acid include zinc salt and magnesium salt. Zinc acrylate is especially preferred.

The amount of the unsaturated carboxylic acid and/or salt thereof as component (B), based on 100 parts of the rubber base material, should be no less than 10 parts, preferably no less than 15 parts, more preferably no less than 20 parts, and no more than 60 parts, preferably no more than 50 parts, more preferably no more than 45 parts, most desirably no more than 40 parts. ("Parts" means "parts by weight" hereinafter.)

The organosulfur compound as component (C) includes thiophenols, thionaphthols, halogenated thiophenols and metal salts thereof, and polysulfides having 2 to 4 sulfur atoms. Typical examples include pentachlorothiophenol, pentafluorothiophenol, pentabromothiophenol, p-chlorothiophenol and zinc salts thereof, alkylphenyl polysulfides having 2 to 4 sulfur atoms (such as diphenylpolysulfide, dibenzylpolysulfide, dibenzoylpolysulfide, dibenzothiazoylpolysulfide, and dithiobenzoylpolysulfide), alkylphenyldisulfide, sulfur compound having a furan ring, and sulfur compounds having a thiophen ring. Of these examples, diphenyldisulfide and zinc salt of pentachlorothiophenol are especially preferred.

The amount of the organosulfur compound, based on 100 parts of the rubber base material as component (A), should be no less than 0.1 part, preferably no less than 0.2 part, more preferably no less than 0.4 part, most desirably no less than 0.7 part, and no more than 5 parts, preferably no more than 4 parts, more preferably no more than 3 parts, most desirably no more than 2 parts, particularly no more than 1.5. With an excessively small amount, the organosulfur compound does not produce the effect of improving rebound resilience; the rubber compound containing the organosulfur compound in an excessively large amount is too soft to provide sufficient rebound resilience.

The inorganic filler as component (D) includes zinc oxide, barium sulfate, and calcium carbonate. The amount of the inorganic filler for 100 parts of component (A) should be no less than 5 parts, preferably no less than 7 parts, more preferably no less than 10 parts, most desirably no less than 13 parts, and no more than 80 parts, preferably no more than 65 parts, more preferably no more than 50 parts, most desirably no more than 40 parts. With an excessively large or small amount, the inorganic filler does not provide an adequate weight and good rebound resilience.

The organic peroxide as component (E) may be selected from known ones. Its typical examples include dicumyl peroxide, 1,1-bis(t-butylperoxy)-3,5,5-trimethylcyclohexane, and α,α'-bis(t-butylperoxy)diisopropylbenzene. They are commercially available under such trade names as Percumyl D (from NOF Corporation), Perhexa 3M (from NOF Corporation), and Luperco 231XL (from Atochem Co.).

The organic peroxide may be one species or a combination of two or more species. It is desirable to use two or more species of organic peroxides from the standpoint of rebound resilience. In this case, they should differ in half-life as specified below. Assuming that the half-life at 155° C. of one organic peroxide having the shortest half-life is designated as $a_t$ and the half-life at 155° C. of another organic peroxide having the longest half-life is designated as $b_t$, then the ratio of $b_t/a_t$ should be no smaller than 7, preferably no smaller than 8, more preferably no smaller than 9, most desirably no smaller than 10, and no larger than 20, preferably no larger than 18, more preferably no larger than 16, most preferably no larger than 14. The rubber compound failing to meet this requirement will be poor in rebound resilience, compression, and durability.

The organic peroxide (a) should have a half-life at (at 155° C.) which is no shorter than 5 seconds, preferably no shorter than 10 seconds, more preferably no shorter than 15 seconds, and no longer than 120 seconds, preferably no longer than 90 seconds, more preferably no longer than 60 seconds. The organic peroxide (b) should have a half-life $b_t$ (at 155° C.) which is no shorter than 300 seconds, preferably no shorter than 360 seconds, more preferably no shorter than 420 seconds, and no longer than 800 seconds, preferably no longer than 700 seconds, more preferably no longer than 600 seconds. The organic peroxide (a) should preferably be 1,1-bis(t-butylperoxy)-3,5,5-trimethylcyclohexane, and the organic peroxide (b) should preferably be dicumyl peroxide.

The total amount of the organic peroxides, based on 100 parts of the rubber base material as component (A), should be no less than 0.1 part, preferably no less than 0.2 part, more preferably no less than 0.3 part, and most desirably no less than 0.4 part, and no more than 3 parts, preferably no more than 2 parts, more preferably no more than 1 part, most desirably no more than 0.8 part, particularly no more than 0.6 part. With an excessively small amount, the rubber compound takes a long time for crosslinking (which leads to low productivity) and the crosslinked product is subject to large compression. With an excessively large amount, the crosslinked product is poor in rebound resilience and durability.

In the case where two or more species of organic peroxides (a) and (b) are used in combination, the amount of (a), based on 100 parts of component (A), should be no less than 0.05 part, preferably no less than 0.08 part, more preferably no less than 0.1 part, and no more than 1.5 parts, preferably no more than 1 part, more preferably no more than 0.7 part, most desirably no more than 0.4 part; and the amount of (b), based on 100 parts of component (A), should be no less than 0.05 part, preferably no less than 0.15 part, more preferably no less than 0.2 part, and no more than 1.5 parts, preferably no more than 1 part, more preferably no more than 0.7 part, most desirably no more than 0.4 part.

The rubber compound may optionally be compounded with an antioxidant. The amount of the antioxidant for 100 parts of component (A) should be no less than 0.05 part, preferably no less than 0.1 part, more preferably no less than 0.2 part, and no more than 3 parts, preferably no more than 2 parts, more preferably no more than 1 part, most desirably no more than 0.5 part. The antioxidant may be selected from commercial ones, such as Nocrac NS-6, Nocrac NS-30 (both from Ouchi Shinko Chemical Industry Co., Ltd.), and Yoshinox 425 (from Yoshitomi Pharmaceutical Industries, Ltd.).

The rubber compound mentioned above may be vulcanized and cured in the same way as the known rubber compound for golf balls. Vulcanization will take 10 to 40 minutes at 100 to 200° C.

The vulcanized product mentioned above may be formed into golf balls of various types in any manner such that they are uniform or varied in hardness across their cross section.

The golf ball according to the present invention may vary in types, such as one-piece golf ball or multi-piece golf ball having a solid core or a solid center. The one-piece golf ball, solid core, or solid center should have adequate stiffness so that their deflection under a load of 980 N (100 kg) is usually no less than 2.0 mm, preferably no less than 2.5 mm, more preferably no less than 2.8 mm, most desirably no less than 3.2 mm, and no more than 6.0 mm, preferably no more than 5.5 mm, more preferably no more than 5.0 mm, most desirably no more than 4.5 mm. An excessively large deflection leads to an unpleasant shot feel and a short flying distance due to deformation and extreme spin caused by a driver shot. An excessively small deflection not only leads to a dull shot feel and an insufficient rebound resilience (which in turn leads to a short flying distance) but also adversely effects resistance to cracking caused by repeated shots.

The golf ball according to the present invention is made up of the vulcanized product obtained from the rubber compound mentioned above. The type of the golf ball is not specifically restricted. It may be a one-piece golf ball, which is formed entirely from the vulcanized product. It may be a two-piece solid golf ball consisting of a solid core and a cover layer formed thereon. The solid core is formed from the vulcanized product. It may be a multi-piece solid golf ball (or three-piece golf ball) consisting of a solid core and two or more cover layers. The solid core is formed from the vulcanized product. It may be a wound golf ball having a center core which is formed from the vulcanized product. Two-piece and multi-piece solid golf balls, in which the solid core is formed from the vulcanized product of the present invention, are desirable from the standpoint of good extrudability, good vulcanizability, and good rebound resilience.

The solid core should have a diameter no smaller than 30.0 mm, preferably no smaller than 32.0 mm, more preferably no smaller than 35.0 mm, most desirably no smaller than 37.0 mm, and no larger than 41.0 mm, preferably no larger than 40.5 mm, more preferably no larger than 40.0 mm, most desirably no larger than 39.5 mm. Particularly, the solid core for two-piece solid golf balls should have a diameter no smaller than 37.0 mm, preferably no smaller than 37.5 mm, more preferably no smaller than 38.0 mm, most desirably no smaller than 38.5 mm, and no larger than 41.0 mm, preferably no larger than 40.5 mm, more preferably no larger than 40.0 mm. The solid core for three-piece solid golf balls should have a diameter no smaller than 30.0 mm, preferably no smaller than 32.0 mm, more preferably no smaller than 34.0 mm, most desirably no smaller than 35.0 mm, and no larger than 40.0 mm, preferably no larger than 39.5 mm, more preferably no larger than 39.0 mm.

The solid core should have a specific gravity no lower than 0.9, preferably no lower than 1.0, more preferably no lower than 1.1, and no higher than 1.4, preferably no higher than 1.3, more preferably no higher than 1.2.

In the case where the present invention is applied to two-piece solid golf balls or multi-piece golf balls, the solid core is made from the vulcanized product mentioned above and the solid core is enclosed with any known cover material and intermediate layer material by injection molding or pressure molding.

The cover material or intermediate layer material should be based on a polyurethane elastomer (thermoplastic or thermosetting), polyester elastomer, ionomer resin, or polyolefin elastomer, or a mixture thereof. They may be used alone or in combination with one another. Of these materials, thermoplastic polyurethane elastomers and ionomer resins are preferable.

The thermoplastic polyurethane elastomer mentioned above is commercially available as exemplified below. Pandex T7298, Pandex T7295, Pandex T7890, Pandex TR3080, Pandex T8295, Pandex T8290, and Pandex T8260 (all from DIC Bayer Polymer, Ltd.), which are produced from an aliphatic or aromatic diisocyanate. The ionomer resin mentioned above is commercially available as exemplified below. Surlyn 6320, Surlyn 8120 and Surlyn 9945 (both from E.I. du Pont de Nemours and Co., Inc.), and Himilan 1706, Himilan 1605, Himilan 1855, Himilan 1601, Himilan 1557 (all from Mitsui-DuPont Polychemicals Co., Ltd.).

In addition, the cover material or intermediate layer material may optionally be compounded with a thermoplastic elastomer or polymer (excluding those mentioned above), such as polyamide elastomer, styrene block elastomer, hydrogenated polybutadiene, and ethylene-vinyl acetate (EVA) copolymer.

The two-piece solid golf ball or multi-piece solid golf ball according to the present invention may be produced by any known method without specific restrictions. A preferred method for two-piece or multi-piece golf balls consists of placing the solid core (formed from the vulcanized product mentioned above) in the injection mold and forming the cover layer (in the case of two-piece golf ball) or forming the intermediate layers and cover layer (in the case of multi-piece golf ball) by injection molding. In some cases, the cover layer may be formed by pressure molding.

The intermediate layer of the multi-piece solid golf ball should have a thickness no smaller than 0.5 mm, preferably no smaller than 1.0 mm, and no larger than 3.0 mm, preferably no larger than 2.5 mm, more preferably no larger than 2.0 mm, most desirably no larger than 1.6 mm.

The cover layer of both the two-piece solid golf ball and the multi-piece solid golf ball should have a thickness no smaller than 0.7 mm, preferably no smaller than 1.0 mm, and no larger than 3.0 mm, preferably no larger than 2.5 mm, more preferably no larger than 2.0 mm, most desirably no larger than 1.6 mm.

The golf ball according to the present invention should conform to the rules for competition, which state that the diameter should be no smaller than 42.67 mm and the weight should be no more than 45.93 g. The upper limit of the diameter should preferably be no larger than 44.0 mm, more preferably no larger than 43.5 mm, most desirably no larger than 43.0 mm. The lower limit of the weight should preferably be no less than 44.5 g, more preferably no less than 45.0 g, further preferably no less than 45.1 g, most desirably no less than 45.2 g.

The golf ball according to the present invention permits production with good workability and exhibits excellent rebound resilience.

EXAMPLES

The invention will be described in more detail with reference to the following examples and comparative examples, which are not intended to restrict the scope thereof.

Examples 1 to 5 and Comparative Examples 1 to 6

Polybutadiene shown in Table 1 was made into a rubber compound according to the formulation shown in Table 2. This rubber compound was formed into a core of a two-piece golf ball by vulcanization at 155° C. for 20 minutes. The core measures 38.9 mm in diameter and weighs 36.0 g. This core was covered with a 1:1 mixture (by weight) of Himilan 1601 and Himilan 1557 by injection molding which forms dimples in the surface. After surface coating with paint, there was obtained a two-piece solid golf ball measuring 42.7 mm in diameter and weighing 45.3 g.

The core was tested for deflection under a load of 100 kg (980 N) and rebound resilience in the following manner. The golf ball was examined for extrudability and flying performance in the following manner. The results are shown in Table 2.

Example 6 and Comparative Examples 7 and 8

A rubber compound was prepared according to the formulation shown in Table 3. This rubber compound was vulcanized at 155° C. for 20 minutes to make a core of a three-piece golf ball, which measures 36.4 mm in diameter and weighs 29.7 g. This core was enclosed with an intermediate layer, 1.65 mm thick, which was injection-molded from a 35:35:30 mixture (by weight) of Surlyn 9945, Himilan 1605, and Dynalon 6100P.

The intermediate layer was further coated with a 1:1 mixture (by weight) of Pandex T8260 and Pandex T8295 by injection molding which forms dimples in the surface. Thus, there was obtained a three-piece solid golf ball measuring 42.7 mm in diameter and weighing 45.5 g.

The core was tested for deflection under a load of 100 kg (980 N) and rebound resilience in the following manner. The golf ball was examined for extrudability and flying performance in the following manner. The results are shown in Table 3.

Example 7 and Comparative Examples 9 and 10

A rubber compound was prepared according to the formulation shown in Table 4. This rubber compound was vulcanized at 170° C. for 30 minutes to make a one-piece golf ball, which measures 42.7 mm in diameter and weighs 45.3 g. This golf ball examined for its performance. The results are shown in FIG. 4.

Deflection Under a Load of 100 kg

The solid core or the one-piece golf ball was tested for deflection (mm) under a load of 100 kg (980 N).

Rebound Resilience

Rebound resilience was evaluated by measuring the initial velocity with an apparatus of the same type as approved by USGA (United States Golf Association). In Examples 1 to 5 and Comparative Examples 1 to 6, the results are expressed in terms of difference from the initial velocity (as the standard) in Comparative Example 1. In Example 6 and Comparative Examples 7 and 8, the results are expressed in terms of difference from the initial velocity (as the standard) in Comparative Example 8. In Example 7 and Comparative Examples 9 and 10, the results are expressed in terms of difference from the initial velocity (as the standard) in Comparative Example 10.

Flying Performance

Flying performance was evaluated by shooting the golf ball at a head speed of 45 m/s (HS 45) with a driver (W#1, Tour Stage X500, loft 9°, shaft X, made by Bridgestone Sports) operated by a shooting machine.

Extrusion Workability

The extruded slug was examined for surface texture and shape, and the result was rated according to the following criterion.
4: very smooth surface texture
3: slightly rough surface texture
2: fuzzy surface texture, extrudable
1: irregular shape, not extrudable

TABLE 1

| Kind | | Maker | Catalyst | Content of cis-1,4 bonds (wt %) | Content of 1,2-vinyl bonds (wt %) | Mooney viscosity ($ML_{1+4}$ (100° C.)) | Molecular weight distribution (Mw/Mn) |
|---|---|---|---|---|---|---|---|
| BR (polybutadiene) | BR 01 | JSR | Ni | 96 | 2.5 | 46 | 4.2 |
| | BR 11 | | Ni | 96 | 2 | 43 | 4.4 |
| | BR 18 | | Ni | 96 | 2 | 59 | 4.2 |
| | BR 730 | | Nd | 96 | 1.3 | 55 | 3 |
| | CNB 700 | | Nd | 96.2 | 1.3 | 43 | 2.8 |
| | BR 51 | | Nd | 96 | 1.3 | 35.5 | 2.8 |

TABLE 2

|  |  |  | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Core Formulation (parts by weight) | BR | BR 01 |  |  |  |  |  |  |  | 100 |  | 30 |  |
|  |  | BR 11 |  |  |  |  |  |  |  |  |  |  |  |
|  |  | BR 18 |  |  |  |  |  |  |  |  | 70 |  |  |
|  |  | BR 730 | 80 | 90 | 80 | 80 | 80 | 100 | 25 |  |  | 70 | 80 |
|  |  | CNB 700 |  |  |  | 20 |  |  |  |  |  |  |  |
|  |  | BR 51 | 20 | 10 |  |  | 20 |  | 75 |  | 30 |  | 20 |
|  | (a) Perhexa 3M-40 *1 | Amount | 0.3 | 0.6 | 0.3 | 0 | 0.3 | 0.6 | 0.3 | 0.6 | 0.6 | 0.6 | 0.6 |
|  |  | Actual | (0.12) | (0.24) | (0.12) | (0) | (0.12) | (0.24) | (0.12) | (0.24) | (0.24) | (0.24) | (0.24) |
|  | (b) Percumyl D *2 |  | 0.3 | 0.6 | 0.3 | 1.2 | 0.3 | 0.6 | 0.3 | 0.6 | 0.6 | 0.6 | 0.6 |
|  | Zinc oxide |  | 20 | 19.5 | 20 | 19.5 | 19 | 19.5 | 20 | 19.5 | 19.5 | 19.5 | 20 |
|  | Antioxidant |  | 0.1 | 0.1 | 0.1 | 0.1 | 0.1 | 0.1 | 0.1 | 0.1 | 0.1 | 0.1 | 0.1 |
|  | Zinc acrylate |  | 28 | 28 | 28 | 28 | 30 | 28 | 28 | 28 | 28 | 28 | 28 |
|  | Zinc salt of pentachlorothiophenol |  | 0.6 | 0.6 | 0.6 | 0.6 | 0.6 | 0.6 | 0.6 | 0.6 | 0.6 | 0.6 | 0 |
| Core performance | Deflection under a load of 100 kg (mm) |  | 3.3 | 2.9 | 3.3 | 2.9 | 2.9 | 2.9 | 3.3 | 3.1 | 3.2 | 3.1 | 2.7 |
|  | Rebound resilience (m/s) |  | +0.4 | +0.6 | +0.4 | +0.4 | +0.8 | +0.6 | ±0 | ±0 | +0.1 | −0.1 | −0.2 |
|  | Extrusion workability |  | 4 | 3 | 3 | 4 | 4 | 1 | 4 | 4 | 4 | 3 | 4 |
| Flying performance | #W1 HS 45 | Carry (m) | 216.7 | 218.8 | 216.5 | 217.0 | 220.5 | 218.5 | 212.5 | 212.1 | 213.3 | 211.0 | 210.3 |
|  |  | Total (m) | 232.8 | 234.5 | 232.5 | 232.4 | 236.3 | 234.3 | 228.7 | 228.0 | 229.5 | 226.8 | 225.5 |

Remarks:
*1 Half-life = 40 seconds,
*2 Half-life = 480 seconds.
Perhexa 3M-40 is a 40% diluted product. (The actual amount is in a parenthesis.)
Note to Table 2
Comparative Example 1:
The sample was good in rebound resilience but was very poor in workability because it was formed from BR alone which was polymerized by using a Ni-based catalyst.
Comparative Example 2:
The sample was good in workability but was poor in rebound resilience because it was formed from a rubber compound containing a large amount of low-rebound BR which was polymerized by using a Ni-based catalyst.
Comparative Example 3:
The sample was poor in rebound resilience because it was formed from low-rebound BR which was polymerized by using a Ni-based catalyst.
Comparative Example 4:
The sample was poor in rebound resilience because it was formed from a rubber compound containing a large amount of low-rebound BR which was polymerized by using a Ni-based catalyst.
Comparative Example 5:
The sample was poor in rebound resilience because it was formed from a rubber compound containing a low-rebound BR which was polymerized by using a Ni-based catalyst.
Comparative Example 6:
The sample was poor in rebound resilience because it was formed from a rubber compound which was not compounded with zinc salt of pentachlorothiophenol.

TABLE 3

|  |  |  | Example 6 | Comparative Example 7 | Comparative Example 8 |
|---|---|---|---|---|---|
| Core Formulation (parts by weight) | BR | BR 01 |  |  | 100 |
|  |  | BR 11 |  |  |  |
|  |  | BR 18 |  |  |  |
|  |  | BR 730 | 80 | 100 |  |
|  |  | CNB 700 |  |  |  |
|  |  | BR 51 | 20 |  |  |
|  | (a) Perhexa 3M-40 (Half-life = 40 seconds) | Amount | 0.3 | 0.6 | 0.6 |
|  |  | Actual | (0.12) | (0.24) | (0.24) |
|  | (b) Percumyl D (Half-life = 480 seconds) |  | 0.3 | 0.6 | 0.6 |
|  | Zinc oxide |  | 20 | 19.5 | 19.5 |
|  | Antioxidant |  | 0.1 | 0.1 | 0.1 |
|  | Zinc acrylate |  | 26 | 24 | 24 |
|  | Zinc salt of pentachlorothiophenol |  | 0.6 | 0.6 | 0.6 |
| Core performance | Deflection under a load of 100 kg (mm) |  | 3.9 | 3.9 | 4.1 |
|  | Rebound resilience (m/s) |  | +0.8 | +0.6 | ±0 |
|  | Extrusion workability |  | 4 | 1 | 4 |

TABLE 3-continued

|  |  |  | Example | Comparative Example | |
|---|---|---|---|---|---|
|  |  |  | 6 | 7 | 8 |
| Flying performance | #W1 HS 45 | Carry (m) Total (m) | 220.1 236.3 | 219.8 235.7 | 214.1 230.3 |

Note to Table 3
Comparative Example 7:
The sample was good in rebound resilience but was poor in workability because it was formed from BR alone which was polymerized by using a Ni-based catalyst.
Comparative Example 8:
The sample was poor in rebound resilience because it was formed from low-rebound BR which was polymerized by using a Ni-based catalyst.

TABLE 4

|  |  |  | Example | Comparative Example | |
|---|---|---|---|---|---|
|  |  |  | 7 | 9 | 10 |
| Core Formulation (parts by weight) | BR | BR 01 |  |  | 100 |
|  |  | BR 11 |  |  |  |
|  |  | BR 18 |  |  |  |
|  |  | BR 730 | 80 | 100 |  |
|  |  | CNB 700 |  |  |  |
|  |  | BR 51 | 20 |  |  |
|  | Percumyl D |  | 0.7 | 0.7 | 1 |
|  | Zinc oxide |  | 23 | 23 | 23 |
|  | Antioxidant |  | 0.2 | 0.2 | 0.2 |
|  | Methacrylic acid |  | 23 | 23 | 23 |
|  | Titanium oxide |  | 1 | 1 | 1 |
| Core performance | Deflection under a load of 100 kg (mm) |  | 2.7 | 2.7 | 2.7 |
|  | Rebound resilience (m/s) |  | +0.8 | ±0.8 | ±0 |
|  | Extrusion workability |  | 4 | 1 | 4 |
| Flying performance | #W1 HS 45 | Carry (m) Total (m) | 207.3 220.1 | 207.0 219.8 | 199.3 212.0 |

Note to Table 4
Comparative Example 9:
The sample was good in rebound resilience but was poor in workability because it was formed from BR alone which was polymerized by using a Ni-based catalyst.
Comparative Example 10:
The sample was poor in rebound resilience because it was formed from low-rebound BR which was polymerized by using a Ni-based catalyst.

The invention claimed is:

1. A golf ball which is formed from a vulcanized rubber compound composed of, 100 parts by weight of a rubber base material, 10 to 60 parts by weight of an unsaturated carboxylic acid and/or a metal salt thereof, 0.1 to 5 parts by weight of an organosulfur compound, 5 to 80 parts by weight of an inorganic filler, and 0.1 to 3 parts by weight of an organic peroxide, said rubber base material being composed of a first polybutadiene accounting for 80 to 95 wt % and a second polybutadiene accounting for 5 to 20 wt % both polybutadiene being synthesized by using a rare earth element-based catalyst, said first polybutadiene containing no less than 60 wt % of cis-1,4 bonds and having a Mooney viscosity ($ML_{1+4}$ (100° C.)) no lower than 50 and said second polybutadiene containing no less than 60 wt % of cis-1,4 bonds and having a Mooney viscosity (ML1+4 (1000C)) no higher than 45.

2. The golf ball of claim 1, wherein the first polybutadiene has a molecular weight distribution Mw/Mn of 2.0 to 6.0, where Mw denotes a weight-average molecular weight and Mn denotes a number-average molecular weight.

3. The golf ball of claim 1, wherein the first polybutadiene is a modified polybutadiene rubber which is obtained by synthesizing an ordinary polybutadiene with a Nd-based catalyst and subsequently reacting the thus obtained polybutadiene with an end group modifier.

4. The golf ball of claim 1, wherein the second polybutadiene has a molecular weight distribution Mw/Mn of 2.0 to 6.0, where Mw denotes a weight-average molecular weight and Mn denotes a number-average molecular weight.

5. The golf ball of claim 1, wherein the second polybutadiene is a modified polybutadiene rubber which is obtained by synthesizing an ordinary polybutadiene with a Nd-based catalyst and subsequently reacting the thus obtained polybutadiene with an end group modifier.

6. The golf ball of claim 1, wherein the second polybutadiene rubber has a Mooney viscosity (ML1+4 (100° C.)) no higher than 40.

7. The golf ball of claim 1, wherein the organic peroxide is composed of two or more species of organic peroxides which are specified by their half-life such that the ratio of bt/at is 7 to 20, where at denotes the half-life of an organic peroxide (a) having the shortest half-life at 155° C. and bt denotes the half-life of an organic peroxide (b) having the longest half-life at 155° C.

8. The golf ball of claim 1, wherein the total content of the organic peroxide is 0.1 to 0.8 part by weight for 100 parts by weight of the rubber base material.

* * * * *